United States Patent [19]

Schnabel

[11] Patent Number: 5,067,048
[45] Date of Patent: Nov. 19, 1991

[54] SOLID ELECTROLYTE CAPACITOR IN A CHIP STRUCTURE AND METHOD FOR THE MANUFACTURING THEREOF

[75] Inventor: Werner Schnabel, Nattheim, Fed. Rep. of Germany

[73] Assignee: Siemens Aktiengesellschaft, Munich, Fed. Rep. of Germany

[21] Appl. No.: 574,797

[22] Filed: Aug. 30, 1990

[30] Foreign Application Priority Data

Sep. 19, 1989 [DE] Fed. Rep. of Germany ....... 3931245

[51] Int. Cl.⁵ ................... H01G 9/00; H01G 5/01
[52] U.S. Cl. ................... 361/540; 29/25.03
[58] Field of Search .............. 361/534, 535, 536, 538, 361/539, 540, 529; 29/25.03

[56] References Cited

U.S. PATENT DOCUMENTS

| | | | |
|---|---|---|---|
| 4,155,156 | 5/1979 | Assmann | 29/628 |
| 4,288,842 | 9/1981 | Voyles | 361/540 |
| 4,483,062 | 11/1984 | Irikura | 29/570 |
| 4,497,105 | 2/1985 | Uemura | 29/570 |
| 4,510,554 | 6/1985 | Irikura | 361/540 |
| 4,562,514 | 12/1986 | Sansa | 361/540 |
| 5,005,107 | 4/1991 | Kobashi et al. | 361/540 |

FOREIGN PATENT DOCUMENTS

| | | |
|---|---|---|
| 0130001 | 1/1985 | European Pat. Off. . |
| 2230629 | 1/1974 | Fed. Rep. of Germany . |
| 2740745 | 5/1982 | Fed. Rep. of Germany . |
| 2125623 | 3/1984 | United Kingdom . |

*Primary Examiner*—Donald A. Griffin
*Attorney, Agent, or Firm*—Hill, Van Santen, Steadman & Simpson

[57] ABSTRACT

A solid electrolyte capacitor in a chip structure is composed of an anode member having an anode wire. A cathode terminal and a anode terminal are arranged as parts of a carrier band. The cathode terminal comprises an auxiliary clip bent in a U-shaped manner and comprises a further auxiliary clip arranged at 90° opposite thereto, the clips at least partially embracing the chip structure. The capacitor is provided with a plastic envelope.

6 Claims, 1 Drawing Sheet

SOLID ELECTROLYTE CAPACITOR IN A CHIP STRUCTURE AND METHOD FOR THE MANUFACTURING THEREOF

CROSS REFERENCE TO RELATED APPLICATIONS

This application is related to an application Ser. No. 07/572,258 filed Aug. 27, 1990, and an application Ser. No. 07/574,798 filed Aug. 30, 1990, now U.S. Pat. No. 5,050,043 issued Sept. 17, 1991, and an application Ser. No. 07/574,796 filed Aug. 30, 1990 and now U.S. Pat. No. 5,007,149 issued Apr. 16, 1991.

BACKGROUND OF THE INVENTION

1. Field of the Invention

The present invention relates to a solid electrolyte capacitor in a chip structure having a sintered anode member composed of a valve metal (electrochemical vent or valve metal), an oxide layer applied on the valve metal and serving as a dielectric, an anode wire sintered into the anode member, a solid electrolyte serving as a cathode, and having an anode terminal, a cathode terminal with a U-shaped auxiliary clip chip that partially embraces the anode member, and a plastic envelope.

2. Description of the Prior Art

Such a capacitor is generally disclosed in U.S. Pat. No. 4,483,062, fully incorporated herein by this reference. The U-shaped auxiliary clip thereby embraces the anode member and provides that the anode member is laterally guided during assembly.

When welding the anode wire to the anode terminal, however, there is the risk that the anode member will be pressed out of the auxiliary clip. This possible dislocation must be taken into consideration in the later enveloping with a plastic material so that the anode member is arranged inside the plastic envelope in all cases. The result thereof is that the outside dimensions of the chip are larger than would actually be required.

Although U.S. Pat. No. 4,497,105 discloses that a further auxiliary clip be arranged vis-a-vis the first, U-shaped auxiliary clip in a capacitor of the type set forth above, the additional auxiliary clip likewise does not prevent a movement of the anode member in the vertical direction.

SUMMARY OF THE INVENTION

It is an object of the present invention to provide a solid electrolyte capacitor in a chip structure of the type initially set forth that has optimally small outer dimensions.

In a solid electrolyte capacitor in a chip structure of the type initially mentioned, the above object is achieved, according to the present invention, in that the cathode terminal has a further auxiliary clip that is arranged opposite the U-shaped auxiliary clip; more specifically, the further auxiliary clip is a U-shaped clip oriented 90° with respect to the first clip.

According to the invention, a method for manufacturing a capacitor in accordance with the present invention is particularly characterized in that the anode member is manufactured with the solid electrolyte and the cathode contacting, the anode member is tin plated and then the anode members are detached, the elements are assembled with the assistance of an automatic pick-and-place unit on a carrier band with the cathode terminals and the anode terminals in the band and, upon utilization of cathode terminals having auxiliary clips, the anode wires are welded to the anode terminals, the cathode terminals are soldered and the capacitors are enveloped with a plastic material.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
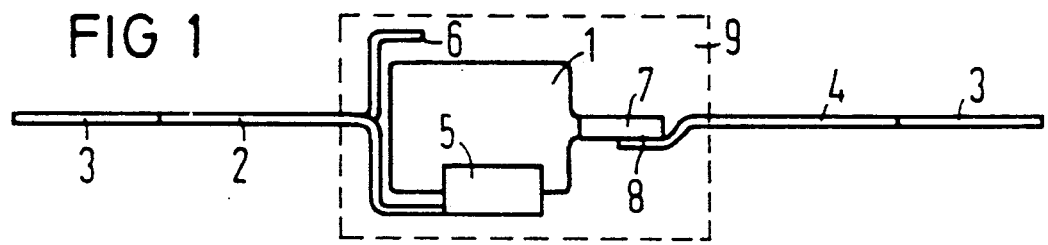
FIG. 1 is a side view of a capacitor constructed in accordance with the present invention.

FIG. 1 illustrates a sintered anode member 1 that is composed of a valve metal such as, for example, tantalum. A solid electrolyte, for example, semiconducting manganese dioxide, serves as a cathode. The sintered member 1 is arranged in a cathode terminal 2 that is part of a carrier band 3 to which the anode terminal 4 is likewise applied. The cathode terminal 2 has a U-shaped auxiliary clip 5 that partially laterally embraces the sintered member 1. A further auxiliary clip 6 is arranged opposite the U-shaped clip 5, the further auxiliary clip 6 limiting the excursion of the sintered member 1 in the upward direction when, for example, the welded connection 8 between the anode wire 7 and the anode terminal 4 is produced. The anode wire 7 is composed of the same material as the anode member 1, i.e. is likewise composed of tantalum given a tantalum anode member.

What is guaranteed by the provision of the upper auxiliary clip 6 is that the anode member 1 is arranged within the envelope 9 in all cases when a plastic envelope 9 is applied. The wall thickness of the envelope 9 is defined only by the spacing between the U-shaped auxiliary clip 5 and the upper auxiliary clip 6.

Figure 2:
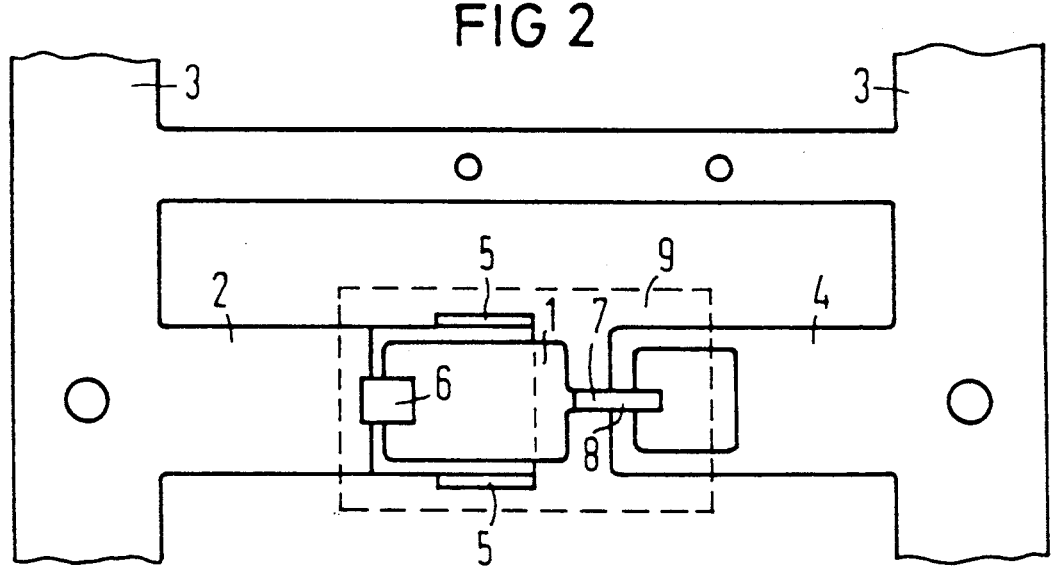
FIG. 2 is a plan view of the structure of FIG. 1.

FIG. 2 illustrates a plan view onto the capacitor from which it may be seen that the cathode terminal 2 and the anode terminal 4 are arranged on a continuous carrier band 3.

Figure 3:
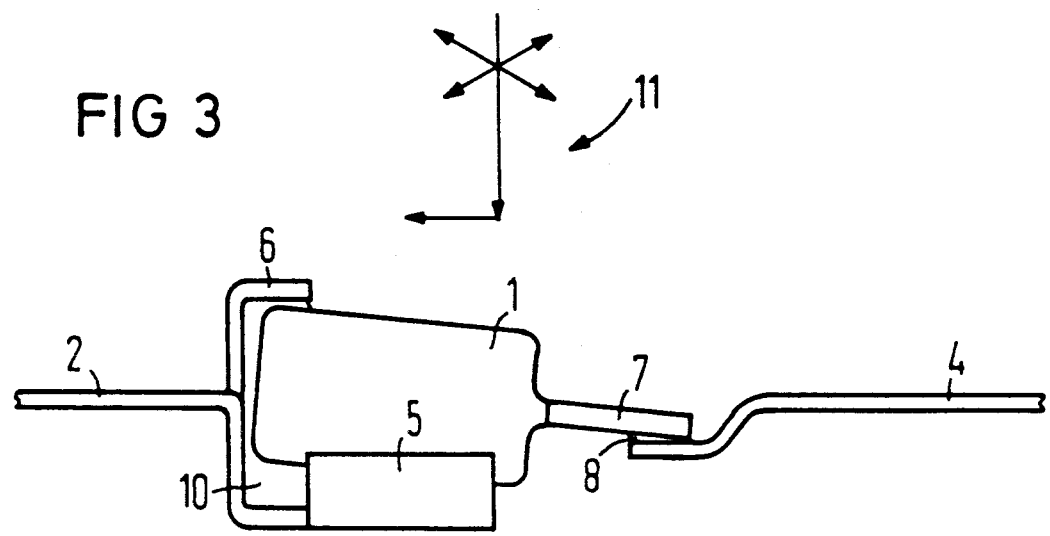
FIG. 3 is an illustration of an assembly method for practicing the method of the present invention.

FIG. 3 illustrates an assembly method for manufacturing a solid electrolyte capacitor in a chip structure. The sintered member 1 is thereby advantageously placed into a "nest" formed by the cathode terminal 2 and the anode terminal 4 in the carrier band 3 by what is referred to as an automatic pick-and-place unit. The motion sequence of the automatic pick-and-place unit in the position of the anode member 1 is identified by the arrows 11.

The cathode contacting arranged on the sintered member 1 is connected to the cathode terminal with solder at 10.

Even given excursion of the anode member 1, it can be seen in FIG. 3 that a limitation of this motion is guaranteed by the upper auxiliary clip 6.

The manufacture of a sintered anode member up to the manufacture of the cathode contacting, for example, a conductive silver lacquer layer, occurs, for example, in conformity with the method disclosed in the German application 27 40 745 C2. The anode members are thereby secured to holding mechanisms and are further processed. Since the exact spacing of the anodes at the holding mechanism is not a prerequisite of the assembly procedure, the smallest possible spacing can be selected.

It is advantageous to tin-plate the anode member into the carrier band before assembly. During the assembly, this measure has the advantages that the anodes have better mechanical protection against damage, that a better automatic manipulability is present in the pick-and-place procedure, and that, finally, a better moistening in a reflow soldering process is guaranteed even after longer intermediate storage.

Higher manufacturing reliability occurs as a result thereof, this being a prerequisite for high yield and a uniformly-high quality and reliability standard of the components.

The tin-plating of the anodes can be integrated into the automatic manufacturing sequence and occurs in that, first of all, the anodes are coated with solder paste, subjected to a reflow soldering (IR or vapor phase process), and in that, subsequent, the anodes are separated from the holding mechanism and placed in magazines in an ordered fashion. Instead of being placed in magazines, the later, ordered offering is also possible via a shaker system. The method steps can preferably be implemented with the assistance of a robot that processes individual holding mechanisms in the sequence, such as:

removal of a holding mechanism with anodes from the retaining frame;

coating the anodes with solder paste;

reflow soldering of the paste with the vapor phase process, whereby the excess fluxing agent drops off so that no additional cleaning is required; and cutting off the anodes and placing them in magazines.

Precision and speed of modern automatic pick-and-place units, together with the flexibility with respect to the manipulation of different, even extremely small objects that has been achieved in the meantime, make these devices suitable for assembling solid electrolyte chip capacitors, as well as other tasks.

The remaining manufacturing steps, such as enveloping, parting, bending the terminals, final shaping, testing, etc., then occur in the usual manner.

The following, critical advantages of the assembly method for chip capacitors as recited above can be listed in summary:

higher anode density per holding mechanism in the prefabrication;

mechanical protection of the anodes by tin plating the anodes before assembly;

ordered offering of the anodes;

reliable positioning of the anodes on the basis of a continuous carrier band system having specially-shaped auxiliary clips;

application of a solder paste for the contacting of the cathode;

positioning of the anode member on the carrier band with an automatic pick-and-place unit;

welding the anode wire directly after the positioning of the member; and reflow soldering of the cathode terminal (immediately following the positioning or in a separate work step), whereby the reflow soldering can occur simultaneously with the welding of the anode wire or can be subsequently implemented in a through put process (IR or vapor phase).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of may contribution to the art.

I claim:

1. A solid electrolyte capacitor, comprising:
    a sintered anode member including a valve metal;
    an oxide layer on said valve metal serving as a dielectric;
    an anode wire sintered to and extending from said anode member;
    a solid electrolyte on said oxide layer serving as a cathode;
    an anode terminal electrically connected to said anode wire;
    a cathode terminal electrically connected to said cathode, said cathode terminal comprising a first U-shaped clip partially embracing said anode member and a second auxiliary clip connected to said first U-shaped clip and oriented parallel and opposed to said first U-shaped clip and partially engaging said anode member; and
    an envelope of plastic material covering said capacitor with said anode and cathode terminals extending therethrough.

2. The solid electrolyte capacitor of claim 1, wherein: said anode wire is tantalum.

3. The solid electrolyte capacitor of claim 1, wherein: said anode member and said cathode wire comprise tantalum.

4. The solid electrolyte capacitor of claim 1, wherein: said solid electrolyte comprises semiconducting manganese dioxide.

5. A solid electrolyte capacitor in a chip structure, comprising:
    a sintered anode member including tantalum as a valve metal;
    an oxide layer on said valve metal serving as a dielectric;
    a tantalum anode wire sintered to and extending from said anode member;
    a semiconducting manganese dioxide solid electrolyte on said oxide layer serving as a cathode;
    an anode terminal electrically connected to said anode wire;
    a cathode terminal electrically connected to said cathode, said cathode terminal comprising a first U-shaped clip partially embracing said anode member and a second auxiliary U-shaped clip connected to said first U-shaped clip and oriented at an angle thereto and partially embracing said anode member, said second auxiliary U-shaped clip extending from and at an angle of 90° with respect to said first U-shaped clip; and
    an envelope of plastic material covering said capacitor with said anode and cathode terminals extending therethrough.

6. A method for manufacturing solid electrolyte capacitors in chip structures in which each capacitor comprises a sintered anode member including a valve metal, an oxide layer on said valve metal serving as a dielectric, and anode wire sintered to an extending from said anode member, a solid electrolyte on said oxide layer serving as a cathode, an anode terminal electrically connected to said anode wire, a cathode terminal electrically connected to said cathode, the cathode terminal comprising a first U-shaped clip partially embracing said anode member and a second auxiliary U-shaped clip connected to said first U-shaped clip and oriented at an angle thereto and partially engaging said anode member, and an envelope of plastic material covering said capacitor with said anode and cathode terminals extending therethrough, comprising the steps of:

(a) forming anode members attached together by a holder and each with an anode wire and a solid electrolyte and a cathode contacting thereon;

(b) tin-plating at least the anode wire;

(c) separating the anode members from the holder;

(d) placing the separating anode members in respective pairs of U-shaped clips and auxiliary U-shaped clips with the anode wires lying over the respective anode terminals;

(e) simultaneously welding anode wires to the anode terminals and soldering the cathodes to the cathode terminals; and (f) enveloping the capacitors with plastic material such that the anode terminals and the cathode terminals extend through the respective envelopes.

* * * * *